US010901495B2

(12) United States Patent
Schwarz

(10) Patent No.: US 10,901,495 B2
(45) Date of Patent: Jan. 26, 2021

(54) TECHNIQUES FOR MULTI-FINGER TYPING IN MIXED-REALITY

(71) Applicant: MICROSOFT TECHNOLOGY LICENSING, LLC, Redmond, WA (US)

(72) Inventor: Julia Schwarz, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/290,882

(22) Filed: Mar. 2, 2019

(65) Prior Publication Data

US 2020/0225735 A1 Jul. 16, 2020

Related U.S. Application Data

(60) Provisional application No. 62/790,916, filed on Jan. 10, 2019.

(51) Int. Cl.
*G06F 3/01* (2006.01)
*G06T 19/00* (2011.01)
(Continued)

(52) U.S. Cl.
CPC ............ *G06F 3/011* (2013.01); *G06F 3/0233* (2013.01); *G06F 3/04886* (2013.01); *G06T 19/006* (2013.01)

(58) Field of Classification Search
CPC .... G06F 3/011; G06F 3/0233; G06F 3/04886; G06T 19/006
See application file for complete search history.

(56) References Cited

U.S. PATENT DOCUMENTS 9,201,539 B2  12/2015  Hinckley et al.
2003/0048260 A1  3/2003  Matusis
(Continued)

FOREIGN PATENT DOCUMENTS

CN  103019377 A  4/2013
CN  105224069 A  1/2016
(Continued)

OTHER PUBLICATIONS

"Finger", Retrieved from: https://developer-archive.leapmotion.com/documentation/javascript/api/Leap.Finger.html#Finger, Retrieved Date: Dec. 28, 2018, 6 Pages.
(Continued)

*Primary Examiner* — Seth A Silverman
(74) *Attorney, Agent, or Firm* — Workman Nydegger

(57) ABSTRACT

Systems and methods are provided for detecting user input in a mixed-reality environment being rendered with one or more holograms. An input receiver that includes a plurality of input elements is presented. An input controller that includes the individual actuators is identified, wherein each corresponding actuator of the individual actuators is configured to, when interacting with one or more input elements of the input receiver that are mapped to the corresponding actuator and when the input state of the corresponding actuator is an active state, provide user input within the mixed-reality environment. Subsequently, the presence of a triggering attribute of the input controller is detected, and in response to detecting the triggering attribute, the input state of a corresponding actuator is changed from an inactive state to an active state for providing user input.

21 Claims, 9 Drawing Sheets

(51) Int. Cl.
*G06F 3/0488* (2013.01)
*G06F 3/023* (2006.01)

(56) References Cited

U.S. PATENT DOCUMENTS

| | | | |
|---|---|---|---|
| 2004/0212590 A1* | 10/2004 | Koo | G06F 3/0233 |
| | | | 345/156 |
| 2011/0254771 A1 | 10/2011 | Zimchoni | |
| 2012/0260207 A1 | 10/2012 | Treskunov et al. | |
| 2018/0350150 A1* | 12/2018 | Powderly | G06F 3/0213 |

FOREIGN PATENT DOCUMENTS

| | | |
|---|---|---|
| EP | 2977855 A1 | 1/2016 |
| GB | 2470654 A | 12/2010 |
| WO | 0229711 A2 | 4/2002 |
| WO | 2012048380 A1 | 4/2012 |
| WO | 2012144666 A1 | 10/2012 |
| WO | 2016010797 A1 | 1/2016 |

OTHER PUBLICATIONS

Grubert, et al., "Effects of Hand Representations for Typing in Virtual Reality", In Proceedings of IEEE Conference on Virtual Reality and 3D User Interfaces, Mar. 18, 2018, pp. 1-8.

Lee, et al., "ARKB: 3D vision-based Augmented Reality Keyboard", In Proceeding of the 13th International Conference on Artificial Reality and Telexistence, Dec. 3, 2003, 4 Pages.

Meyers, Dean, "Google and Magic Leap push us towards the death of the keyboard", Retrieved from: https://vizworld.com/2018/10/google-and-magic-leap-push-us-towards-the-death-of-the-keyboard/, Oct. 2018, 10 Pages.

Nafarrete, Jonathan, "Hands-On: Samsung Gear VR Rink Controllers", Retrieved from: https://vrscout.com/news/demo-samsung-gear-vr-rink-controllers/, Jan. 7, 2016, 9 Pages.

"International Search Report & Written Opinion issued in PCT Application No. PCT/US19/068459", dated Apr. 24, 2020, 19 Pages.

* cited by examiner

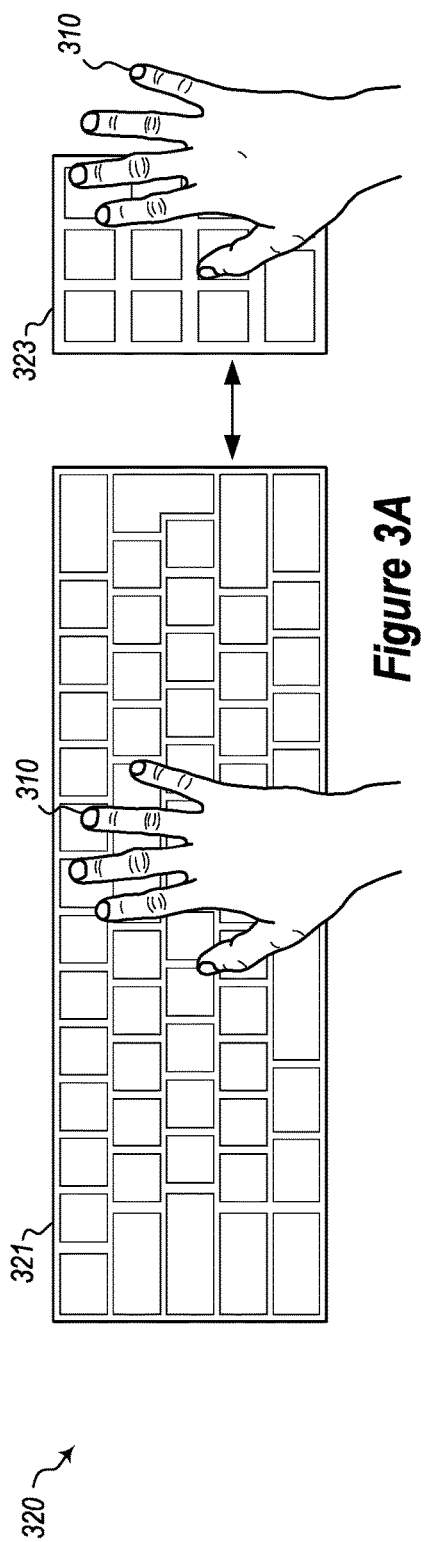
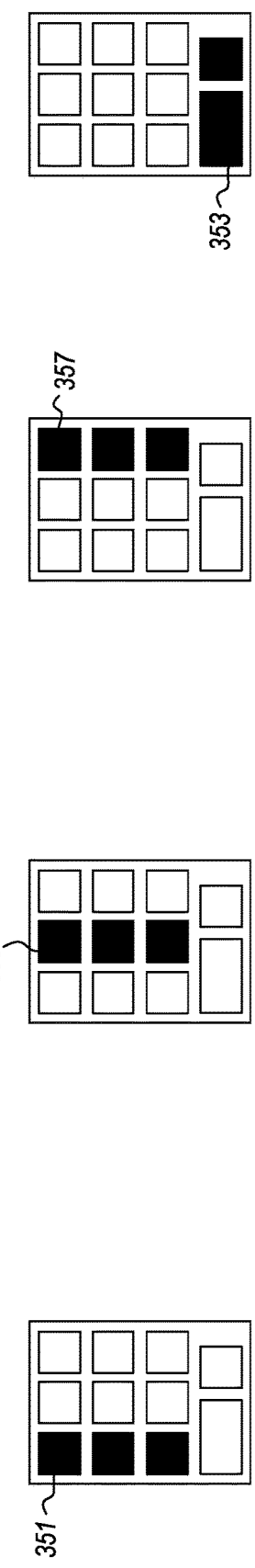
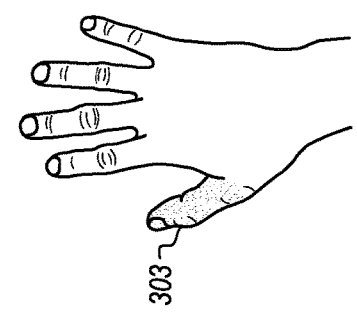
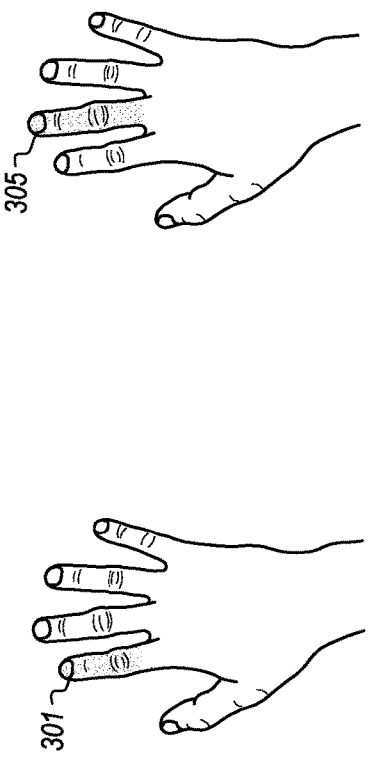
*Figure 3A*
*Figure 3B*

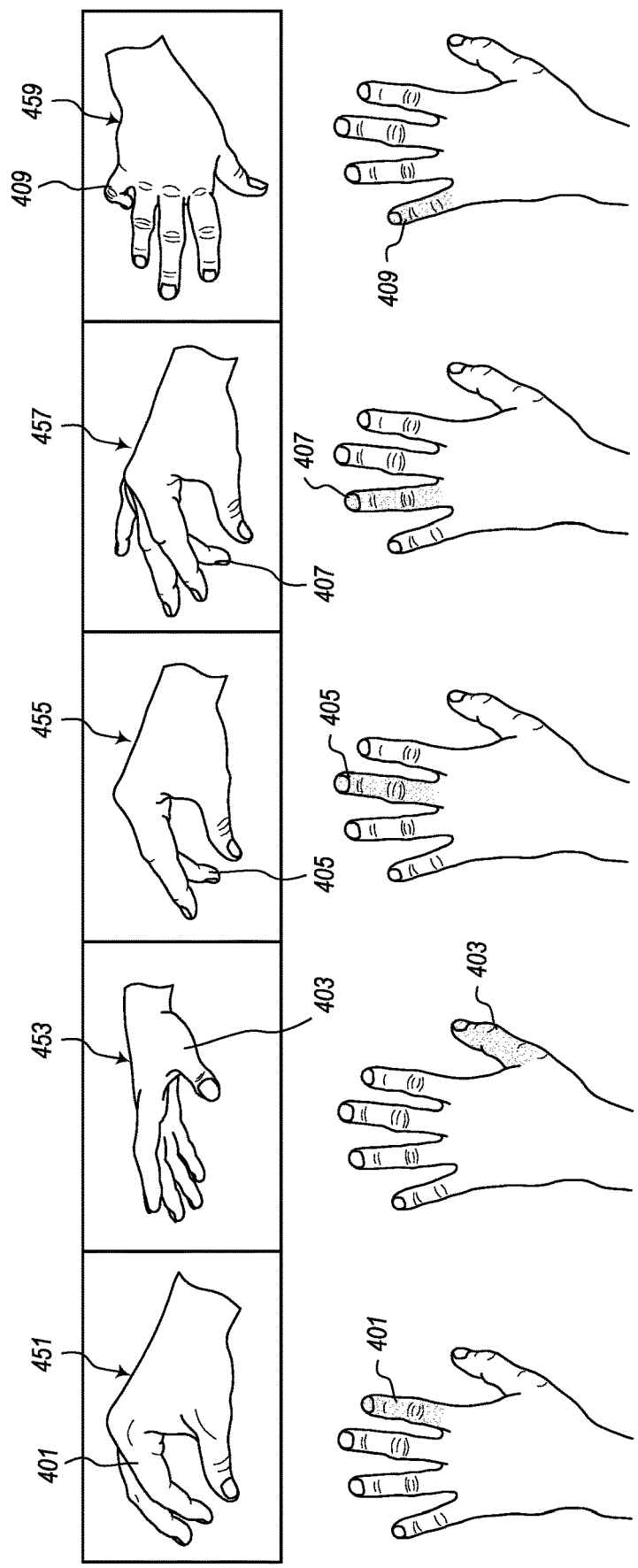
*Figure 4A*  *Figure 4B*  *Figure 4C*  *Figure 4D*  *Figure 4E*

TECHNIQUES FOR MULTI-FINGER TYPING IN MIXED-REALITY

CROSS-REFERENCE TO RELATED APPLICATIONS

This application claims the benefit of and priority to U.S. Provisional Patent Application Ser. No. 62/790,916 filed on Jan. 10, 2019 and entitled "TECHNIQUES FOR MULTI-FINGER TYPING IN MIXED-REALITY," which application is expressly incorporated herein by reference in its entirety.

BACKGROUND

"Augmented reality" typically refers to virtual experiences where virtual objects are visually placed within the real world, such that a user experiences virtual content and the real world simultaneously. In contrast, "virtual reality" typically refers to immersive virtual experiences where a user's view of the real-world is completely obscured and only virtual objects are perceived. Typically, "mixed-reality" refers to either augmented reality or virtual reality environments. However, for the sake of clarity and simplicity, the terms mixed-reality, virtual reality, and augmented reality are used interchangeably herein.

Mixed-reality systems are typically configured as head mounted displays that generate and/or render the mixed-reality content. Continued advances in hardware capabilities and rendering technologies have greatly increased the realism of virtual objects and scenes displayed to a user within mixed-reality environments. For example, virtual objects can be placed within a mixed-reality environment in such a way as to give the impression that the virtual object is part of the real world.

Some mixed-reality systems have been configured to track the movement of a user's body parts, such as the user's hands, as the user interacts with virtual objects in the mixed-reality environment. Furthermore, some mixed-reality systems are configured to replicate the user's body parts within the mixed-reality, such that the user is able to view and control virtualized body parts within the mixed-reality environment. For instance, a user's hand can be presented as a hologram occlusion that moves within the mixed-reality environment in direct response to the movements of their own real-world hand. As the user moves their real-world hand, the hand occlusion is also moved, such that it is capable of interacting with other virtual objects within the mixed-reality environment.

Many mixed-reality systems allow users to use their body parts (or tools or other controllers manipulated thereby) to interact with virtual objects in the mixed-reality environment. For instance, some mixed-reality systems allow a user to use their hands (or virtual representations thereof) to interact with a virtual keyboard, touch screen, or other virtual input receiver.

Several obstacles exist, however, in optimizing a user's ability to use their hands to interact with virtual input receivers in mixed-reality environments. For instance, in contrast with physical input devices, virtual input receivers such as virtual keyboards do not provide users with any physical force feedback to inform the users that they have successfully pressed a virtual key. Consequently, if a user attempts interact with a virtual keyboard, they will often unintentionally move their fingers through the virtual keyboard and cause accidental key presses with other keys in the proximity to the intended key. For example, as a user attempts to press the "F" key with their index finger on a virtual QWERTY layout keyboard, the user's hand may unintentionally move through the virtual keyboard, causing their middle finger to accidentally press the "D" key and/or their ring finger to accidentally press the "S" key. In another example, where a user's thumb rests lower than their other fingers, the user's thumb will inadvertently pass through the virtual keyboard and result in an accidental press of the spacebar.

One possible solution to address this issue includes restricting the input points of the user's hand to just the tip of the user's index finger. This solution, however, eliminates the possibility of multi-finger interfacing with virtual input receivers. Another possible solution includes performing motion analysis on all of the user's fingers and applying heuristics to infer the typed word. This solution, however, can be very computationally expensive and can, sometimes, result in the system being slightly lagging and unresponsive to actual user interactions. This in turn, can result in the user providing exaggerated and/or additional input gestures that can further exacerbate the problem.

Accordingly, there is an ongoing need in the field of mixed-reality for providing improved multi-fingered interaction with virtual input receivers in mixed-reality environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for detecting and selectively applying user input to input elements presented within a mixed-reality environment.

In some embodiments, a mixed-reality system renders a mixed-reality environment with one or more holograms. The mixed-reality system then presents an input receiver within the mixed-reality environment as a hologram. The input receiver includes a plurality of input elements that are configured for selectively receiving input from a plurality of individual actuators of an input controller based on an input state of the individual actuators and a mapping of the individual actuators to different input elements.

In some embodiments, during use, the mixed-reality system identifies an input controller that includes the individual actuators, wherein each corresponding actuator of the individual actuators is configured to, when interacting with one or more input elements of the input receiver that are mapped to the corresponding actuator and when the input state of the corresponding actuator is an active state, provide user input within the mixed-reality environment. Subsequently, the mixed-reality system detects a presence of a triggering attribute of the input controller that is operable, when present in the mixed-reality environment, to selectively change the input state of the corresponding actuator from an inactive state to an active state for the one or more input elements that are mapped to the corresponding actuator. Finally, in response to detecting the presence of the triggering attribute of the input controller, the mixed-reality system selectively modifies the input state of the corresponding actuator from the inactive state to the active state for enabling the corresponding actuator to provide the user input when the corresponding actuator interacts with the one or more input elements that are mapped to the corresponding actuator within the mixed-reality environment.

In other embodiments, a mixed-reality system identifies an input controller for providing input in the mixed-reality environment, the input controller including a plurality of actuators, wherein the individual actuators of the plurality of actuators are configured to interact with one or more input elements of an input receiver to provide corresponding user input through the one or more input elements of an input receiver in the mixed-reality environment. The mixed-reality system then identifies the input receiver which comprises a hologram that includes a plurality of input elements that are each configured, when interacted with by one or more of the plurality of actuators, for receiving the corresponding user input. Subsequently, the mixed-reality system maps each of the individual actuators of the plurality of actuators to a respective set of the input elements of the input receiver, such that each of the individual actuators is configured to only provide user input to the respective set of input elements to which it is associated and wherein at least a first actuator of the plurality of actuators is mapped to a first set of input elements that is different than a second set of input elements that is mapped to a second actuator of the plurality of actuators.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 3A and 3B illustrate an additional exemplary mapping of one or more input elements of an input receiver to actuators of an input controller in response to detecting a change in position of the input controller with respect to the input receiver;

FIGS. 4A-4E illustrate an embodiment of an input controller including a plurality of individual actuators and exemplary triggering attributes for selectively changing the input state of an actuator from an inactive state to an active state;

DETAILED DESCRIPTION

Figure 1:
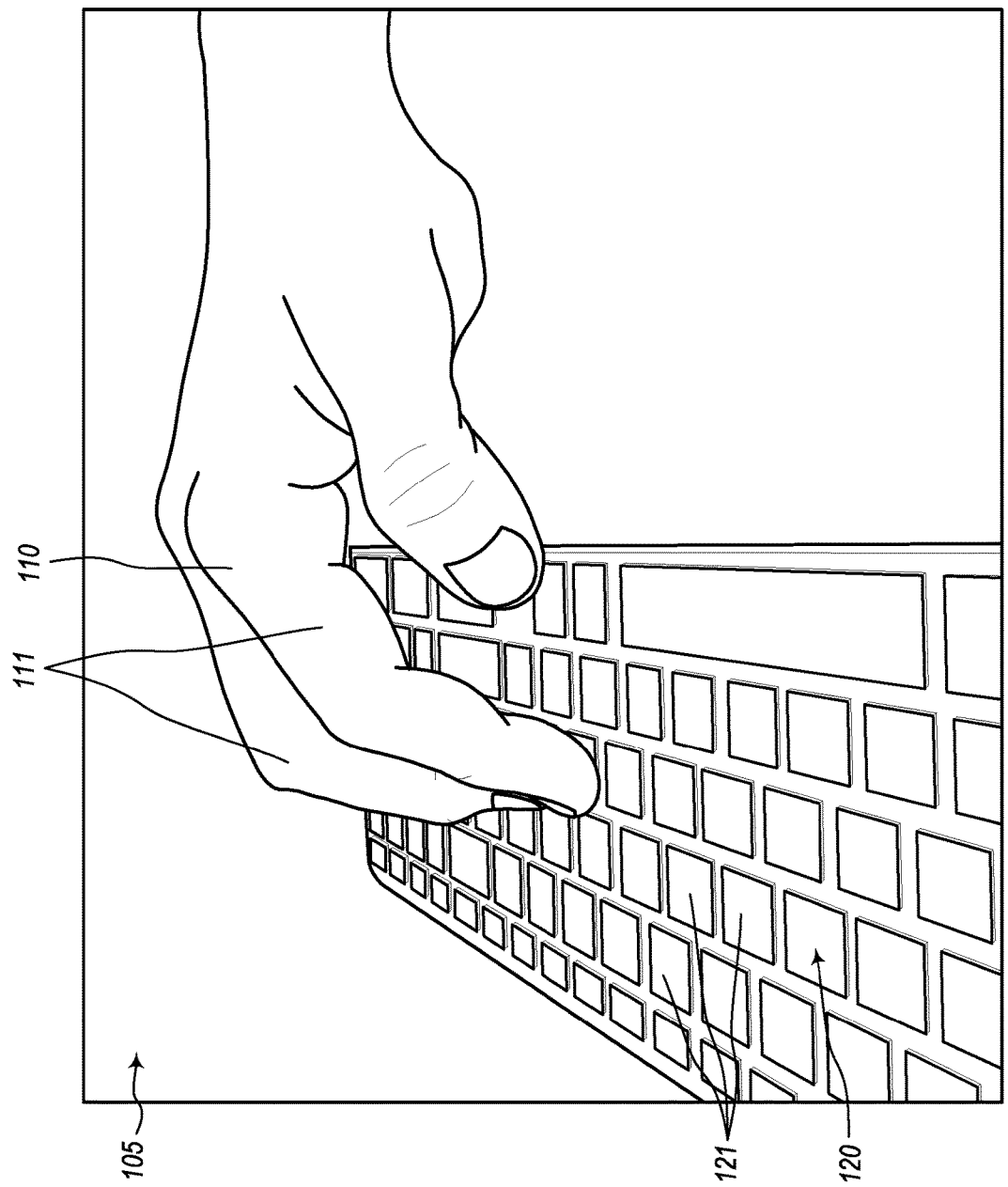
FIG. 1 illustrates an embodiment of an input controller positioned near an input receiver in a mixed-reality environment.

At least some disclosed embodiments described herein relate to mixed-reality systems configured to detect user input in a mixed-reality environment. Many mixed-reality systems detect the movement of user input controllers, which are sometimes implemented as part of a user's body such as their hands, to allow users to interact with virtual objects in the mixed-reality environment. By way of example, some mixed-reality systems allow a user to use their hands (or virtual representations thereof) to interact with a virtual keyboard, touch screen, or other virtual input receiver.

One challenge associated with detecting user input in a mixed-reality environment is that mixed-reality objects and input receivers provide no physical resistance to user gestures. In one example, a virtual keyboard provides no physical force feedback to a user's fingers and thus fails to physically inform the user that the user has successfully pressed a virtual key. Because of this, if a user attempts interact with a virtual keyboard, the user can unintentionally move their fingers and hand through the virtual keyboard and cause controller/input element interactions in a plurality of unintended instances. This problem exists for virtual keyboards as well as other types of menu interfaces that include a plurality of individually selectable input elements (e.g., keys, buttons, menu items, icons, etc.)

Some solutions attempting to address this issue include restricting the input point of the user's hand to only the tip of the user's index finger. However, this solution, in some instances, eliminates the possibility of multi-finger interfacing with virtual input receivers. Another possible solution includes performing motion analysis on all of the user's fingers and applying heuristics to infer the typed word. This solution, however, can prove computationally expensive for a mixed-reality system.

This disclosure includes embodiments which may address some or all of the aforementioned challenges with the detection of detecting user input in a mixed-reality environment. In some embodiments, after rendering a mixed-reality environment including an input receiver and input controller, a mixed-reality system detects the presence of a triggering attribute of the input controller to change an input state of an actuator of the input controller from an inactive state to an active state, wherein the actuator becomes operable to provide user input to an input element when in the active state.

Those skilled in the art will recognize that, in some instances, the embodiments disclosed herein provide significant benefits over conventional systems and methods for detecting user input in mixed-reality environments. For example, some disclosed embodiments provide users with mixed-reality system functionality that ameliorates and/or eliminates the unintentional entry of user input in mixed-reality input receivers.

Having just described some of the various high-level features and benefits of the disclosed embodiments, attention will now be directed to FIGS. 1 through 8. These figures illustrate various functionalities, examples, supporting illustrations, and methods related to detecting user-object interactions in mixed-reality environments. Subsequently, attention will be directed to FIG. 9, which presents an example computer system that may be used to facilitate the disclosed principles.

The following embodiments are discussed in the context of a mixed-reality system (e.g., computer system 900 illustrated in FIG. 9) where a mixed-reality environment including one or more holograms is presented to a user at a mixed-reality display device and where the user may interact with one or more objects. A user-operated control (e.g., a user's hand) for interacting with the mixed-reality environment may be tracked by the mixed-reality system (see FIG. 9 and the relevant discussion of sensors 920 and 930) such that the mixed-reality system detects movement, pose, and/or other characteristics of the user control. In response to detecting certain movement, poses, and/or other variables/values based on such movement and/or poses of the user control, the mixed-reality system may execute certain commands and/or input to shape the user experience based on selectively receiving and/or processing the input based on predefined mappings between the control element attributes (e.g., pose, type, orientation, velocity, etc.) and input element attributes (preferences for acceptable input).

Attention is now directed to FIG. 1, which illustrates an embodiment of an input controller 110 positioned near an input receiver 120 in a mixed-reality environment 105. As illustrated in FIG. 1, the input controller 110 is embodied as a user's hand (or a virtual representation thereof), and the input receiver 120 is embodied as a QWERTY layout virtual keyboard. The user's hands include several fingers for interacting with the virtual keyboard, and the virtual keyboard includes various keys for receiving input from the user's hand (e.g., the alphanumeric, modifier, cursor, system command, and other keys of the virtual keyboard).

In the current representation, the user's hand is one type of input controller 110 having a plurality of different actuators 111 (e.g., fingers) and the keyboard is one example of an input object (e.g., an input receiver 120) with a plurality of individual input elements 121. In other embodiments, the keyboard is a virtual hologram presented in a mixed-reality environment. Additionally, or alternatively, the user's hand can be a hologram representation of the user's hand that maps to an actual user's hand.

In other embodiments different types of input receivers and controllers are provided as holograms and/or real-world components to implement the disclosed embodiments. For instance, those skilled in the art will also recognize that input controllers beyond those illustrated in FIG. 1 are within the scope of this disclosure. For instance, an input controller may be implemented as any object including a plurality of individual actuators which are configurable to interact with one or more input elements of an input receiver. By way of example, an input controller may be implemented as a plurality of user-operated control wands. Furthermore, it will be appreciated that the input receiver need not be embodied as a QWERTY layout virtual keyboard, and that the input receiver is implementable as any virtual object including a plurality of input elements that are configured for selectively receiving input from individual actuators of an input controller. For example, in some embodiments, an input receiver is a virtual ABCDE, Dvorak, Colemak, or Workman layout keyboard, or a virtual touch screen, digitizer, or tablet. In other embodiments, the virtual object is a menu interface with a plurality of selectable objects or icons. A controller may also be an object controller other than a representation of a user hand, such as, but not limited to a wand with different portions (e.g., ends) or appending elements that act as separate actuators.

As noted, FIG. 1 is only provided as a reference and not an actual limitation of the type of controllers and input receivers that can be used. Indeed, it will be appreciated that the disclosed embodiments include and/or apply to different types of controllers and/or input receivers, including various combinations of virtual (e.g., hologram) components and different shapes and configurations of controllers (other than hands) and input receivers (other than keyboards).

Figure 2:
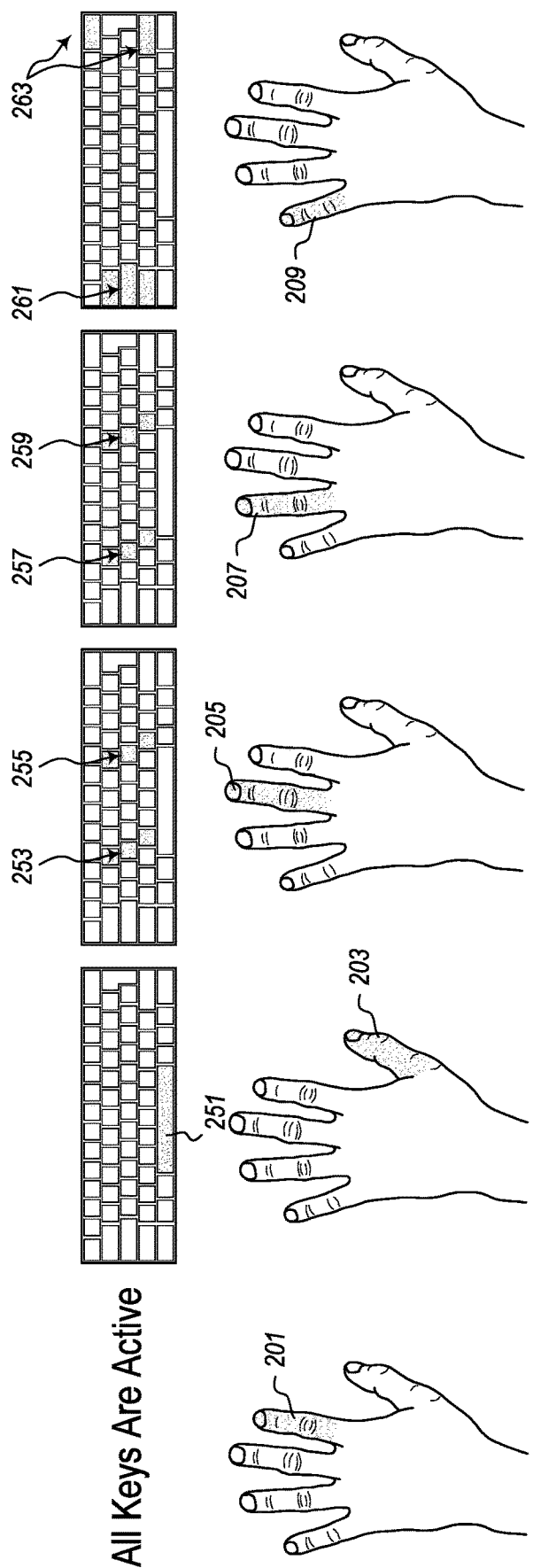
FIG. 2 illustrates an exemplary mapping of one or more input elements of an input receiver to corresponding actuators of an input controller in a mixed-reality environment.

FIG. 2 illustrates an exemplary mapping of one or more input elements of an input receiver to corresponding actuators of an input controller in a mixed-reality environment. In some instances, because mixed-reality receiver devices are non-physical, a user's hand or controller may drift from its intended location with respect to the input receiver, particularly when a user is performing touch typing and not looking at the virtual input receiver while interacting with it. Accordingly, a user may inadvertently press unintended input elements in the course of interacting with a mixed-reality input receiver.

To ameliorate this issue, in some embodiments, a mixed-reality system maps each individual actuator of a mixed-reality input controller to a corresponding set or subset of input elements of the mixed-reality input receiver. As such, in such embodiments, each individual actuator becomes configured for selectively providing or enabling user input to be entered, received and/or processed at only the subset of input elements of the input receiver to which the individual/corresponding actuator is mapped. The mapping can be stored in memory of the mixed-reality system or accessed remotely from another system during, for example, cloud processing implementations.

As depicted in FIG. 2, visual correlations are shown, corresponding to the mappings, between the different fingers (e.g., actuators) of the user's hand (e.g., input controller) and the sets or subsets of keys (e.g., input elements) of a mixed-reality keyboard (e.g., input object). In the illustrated embodiment, the user's index fingers 201 are mapped to all keys, such that a user may elect to interact with all keys of the keyboard with only their index fingers. Furthermore, in this embodiment, the user's thumbs 203 are only mapped to provide input to the spacebar 251 of the keyboard. The user's middle fingers 205 are mapped to the E, D, and C keys (for the user's left middle finger, denoted by numeral 253) and to the I, K, and comma/less than keys (for the user's right middle finger, denoted by numeral 255). The user's ring fingers 207 are mapped to the W, S, and X key (for the user's left ring finger, denoted by numeral 257) and to the O, L, and period/greater than keys (for the user's right ring finger, denoted by numeral 259). As shown, the user's pinkies are mapped to the Tab, Caps Lock, and left Shift keys (for the user's left pinky, denoted by numeral 261) and to the Backspace, and right Shift keys (for the user's right pinky, denoted by numeral 263). In this regard, each of the plurality of actuators (fingers) are mapped to a different corresponding subset of the plurality of input elements (keys) of the input receiver (keyboard).

It will be appreciated that mappings between individual actuators and sets of input elements are not limited to those illustrated in FIG. 2. For example, a user's pinkies may be additionally mapped to the Q, A, and Z keys (for the user's left pinky) and to the P, semicolon/colon key, and the slash/question mark key (for the user's right pinky). Furthermore, various user fingers may be mapped to various number keys of a mixed-reality keyboard.

It should also be noted that the mixed-reality system may map individual actuators to sets of input elements of an input receiver in various manners. For example, in some embodiments, the mixed-reality system maps the actuators to the input elements in a static manner, such as by predefining the mappings before receiving user input from the actuators at the input receiver. In another example, the mixed-reality system maps the actuators to the input elements in a dynamic manner, such as by detecting the position or repositioning of the actuators relative to the input elements and changing the mapping based on the position or repositioning of the actuators with respect to the input elements. The alternative mapping embodiments may be beneficial, for example, in situations where a user types in an unconventional manner or has an irregular hand configuration (e.g., a user who is missing a finger).

Furthermore, the dynamic mapping implementations may prove beneficial in situations where a user must reposition their input controller(s) to interact with certain input elements of an input receiver. By way of example, FIG. 3A illustrates a virtual keyboard 320 which includes a QWERTY layout portion 321 and a number pad 323. In order for a user to provide input at the number pad 323, the user must position their input controller (shown here as hand 310) over the number pad 323 to interact with the input elements of the number pad 323. In some instances, the user alternates between using the QWERTY layout portion 321 of the keyboard and the number pad 323 of the keyboard, and vice versa. As such, the mixed-reality system detects whether the user has changed the position of their hand 310 from being over the QWERTY layout portion 321 to the number pad 323, or vice versa (indicated by the arrow of FIG. 3A).

Upon detecting that the user has positioned their hand 310 over the number pad 323, the mixed-reality system then changes the mapping of the actuators (fingers) of the user's input controller (hand 310) to correspond with the input elements of the number pad 323, rather than the input elements of the QWERTY layout portion 321. This is demonstrated in FIG. 3B, where, in response to detecting the user positioning their hand 310 over the number pad 323, the mixed reality system maps the user's index finger 301 to the 7, 4, and 1 keys (denoted by numeral 351) of the number pad 323. Furthermore, the user's middle finger 305 is mapped to the 8, 5, and 2 keys (denoted by numeral 355) of the number pad 323, the user's ring finger 307 is mapped to the 9, 6, and 3 keys (denoted by numeral 357) of the number pad 323, and the user's thumb 303 is mapped to the 0 and decimal point keys (denoted by numeral 353) of the number pad 323.

It will be appreciated that mappings between individual actuators and sets of input elements are not limited to those illustrated in FIG. 3B. For example, a user's pinkies may be additionally mapped to the + and Enter keys of the number pad. Furthermore, various user fingers may be mapped to various number keys of a mixed-reality keyboard in other configurations.

The mapping for any portion of an input receiver may also be based on attributes/input affinity of the input elements that receive input in combination with the attributes or properties of the controllers, such as the controller type or identifiers (e.g., a particular finger or wand type/identifier), as well as, or alternatively, to any other particular attribute(s) of the controller elements (e.g., pose, orientation, velocity, etc.)

Attention is now directed to FIGS. 4A-4E, which illustrate an embodiment of an input controller including a plurality of individual actuators and exemplary triggering attributes for selectively changing the input state of an actuator from an inactive state to an active state. To prevent inadvertent user interaction between the actuators and the input elements of the input receiver, an input state of the various actuators of the input controller may, in some embodiments, be switched between an active state and an inactive state. When an actuator is in an active state, the actuator is enabled for providing user input upon interacting with an input element of an input receiver (e.g., an input element to which the actuator is mapped, as described in FIGS. 2 and 3B). In contrast, when an actuator is in an inactive state, the actuator is disabled from providing user input to the input elements of the input receiver, even when the actuator interacts or interfaces with an input element of the input receiver.

In some embodiments, the mixed-reality system detects the presence of a triggering attribute associated with the input controller or the actuators thereof. In response to detecting the presence of the triggering attribute, the mixed-reality system selectively modifies the input state of a corresponding actuator from the inactive state to the active state for enabling the corresponding actuator to provide user input to an input element when the actuator interacts with the input element.

The triggering attributes associated with the input controller which are detectable by the mixed-reality system may take on various forms. For example, as illustrated in FIGS. 4A-4E, the triggering attribute is based on a pose of one or more of the individual actuators of the input controller. FIGS. 4A-4E show, in the illustrated embodiment, a plurality of poses associated with the user's hand, and the mixed-reality system detects the presence of any of these poses as a triggering attribute for modifying the input state of the user's finger (e.g., actuator) that corresponds to the pose detected.

The poses of FIGS. 4A-4E correspond to some of the configurations that a user may put their hand into in order to type on a keyboard. FIG. 4A shows an exemplary user's hand pose 451 when pressing a key on a keyboard with an index finger 401, and when the mixed-reality system detects a corresponding pose 451, the mixed-reality system selectively modifies the input state of the index finger 401 to the active state, as indicated by the lower portion of FIG. 4A showing a highlighted index finger 401. FIG. 4B shows an exemplary user's hand pose 453 when pressing a key on a keyboard with a thumb 403, and when the mixed-reality system detects a corresponding pose 453, the mixed-reality system selectively modifies the input state of the thumb 403 to the active state, as indicated by the lower portion of FIG. 4B showing a highlighted thumb 403. FIG. 4C shows an exemplary user's hand pose 455 when pressing a key on a keyboard with a middle finger 405, and when the mixed-reality system detects a corresponding pose 455, the mixed-reality system selectively modifies the input state of the middle finger 405 to the active state, as indicated by the lower portion of FIG. 4C showing a highlighted middle finger 405.

FIG. 4D shows an exemplary user's hand pose 457 when pressing a key on a keyboard with a ring finger 407, and when the mixed-reality system detects a corresponding pose 457, the mixed-reality system selectively modifies the input state of the ring finger 407 to the active state, as indicated by the lower portion of FIG. 4D showing a highlighted ring finger 407. FIG. 4E shows an exemplary user's hand pose 459 when pressing a key on a keyboard with a pinky 409, and when the mixed-reality system detects a corresponding pose 459, the mixed-reality system selectively modifies the input state of the pinky 409 to the active state, as indicated by the lower portion of FIG. 4E showing a highlighted pinky 409. In this regard, in some embodiments, the system selectively modifies the input state of one or more actuators of an input controller (e.g., fingers of a hand) based on a pose of a set of individual actuators of the input controller.

Those skilled in the art will recognize that, in some embodiments, when a finger or actuator of an input controller is in an active state, the finger or actuator is configured for providing user input only to the input elements of the input receiver to which the finger or actuator is mapped for providing user input via interaction. Furthermore, when the user's finger or another actuator of an input controller is in an active state, it may be visually highlighted with coloring, texturing, animation (pulsing), or any other type of highlighting that is temporarily rendered while the actuator is in an active state and that is removed when it is in an inactive state. The visual highlighting may be rendered as a hologram displayed to the user in a mixed-reality display as a hologram that is mapped to and that visually overlaps the real-world control object such as a user's finger (either only partially or, alternatively, entirely). When the actuator is a hologram itself, the visual highlighting may be applied directly to the actuator display. In other embodiments, the actuator is put into and out of an active state without any visual information being generated or rendered to the user to reflect the active/inactive state(s) of the object/control actuator(s).

Figure 5:
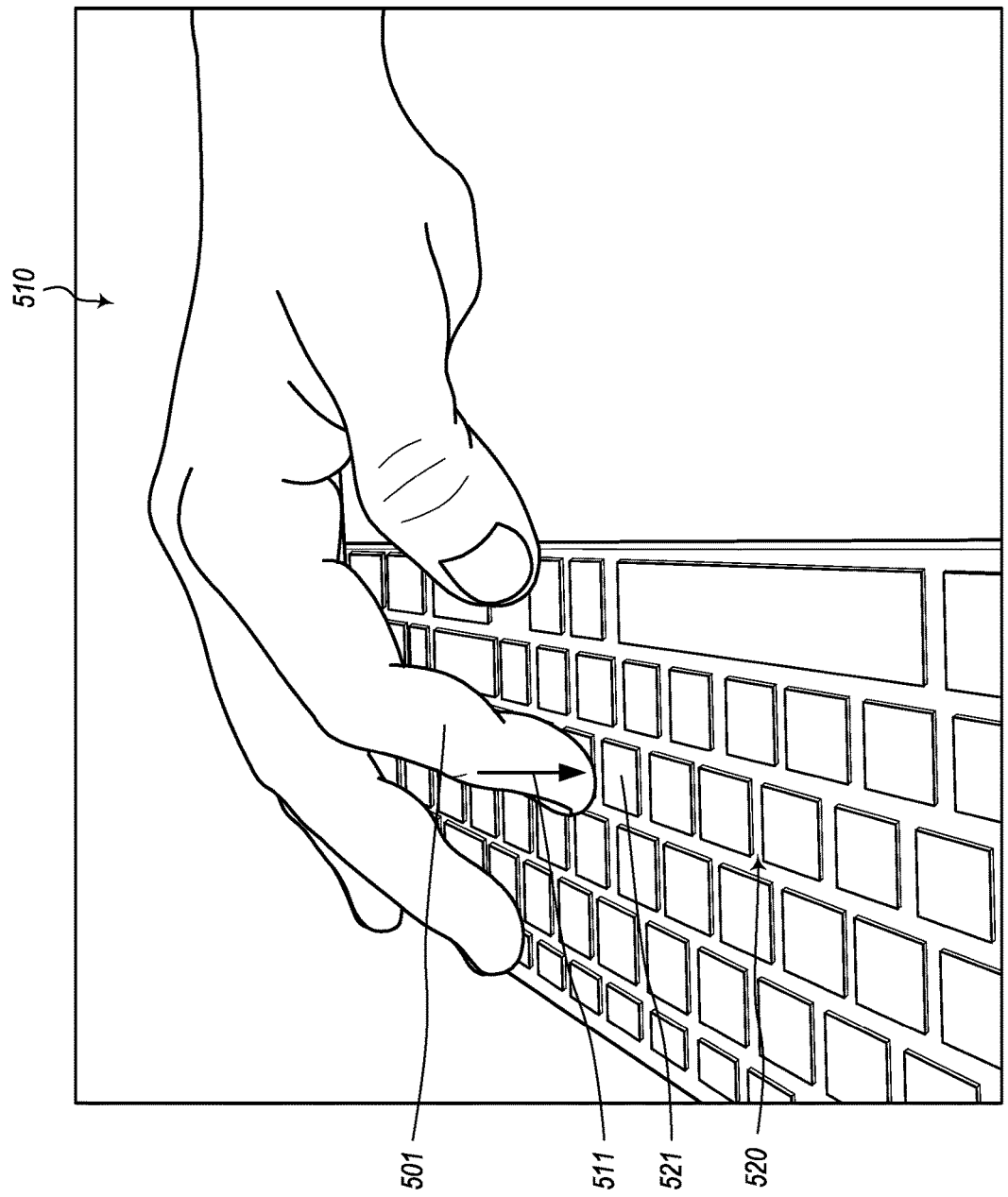
FIG. 5 illustrates exemplary embodiments of triggering attributes of an input controller for selectively changing the input state of an actuator from an inactive state to an active state.

Additional triggering attributes associated with the input controller for selectively modifying the input state of one or more actuators are also possible, some of which are illustrated in FIG. 5. In at least one embodiment shown in FIG. 5, the triggering attribute of the input controller is based on a motion characteristic of a set of one or more of the individual actuators of the plurality of actuators of the input controller. The arrow 511 illustrated in FIG. 5 indicates a velocity or acceleration of the user's index finger 501 as it moves downward toward the keys 521 of the virtual keyboard 520. In the illustrated embodiment, the mixed-reality system detects motion characteristics (e.g., velocity and/or acceleration) of the actuators (e.g., user's index finger 501) of the input controller (e.g., user's hand 510), and where the motion characteristics of a particular actuator exceed a predetermined threshold value for the particular actuator (e.g., a threshold velocity or acceleration), the mixed-reality system selectively modifies the input state of the particular actuator (e.g., from an inactive state to an active state, or vice versa).

In other embodiments, the triggering attribute of the input controller is based on a position of a set of one or more of the individual actuators of the plurality of actuators relative to a set of one or more input elements of the input receiver. For example, as shown in FIG. 5, the user's index finger 501 is in closer proximity to the virtual input receiver 520 than the user's other fingers. In the illustrated embodiment, the mixed-reality system detects a distance between the various actuators of the input controller 510 and one or more of the input elements 521 of the input receiver 520. Upon detecting that the distance between a particular actuator (e.g., index finger 501) and one or more of the input elements 521 of the input receiver 520 meets a predetermined distance threshold, the mixed-reality system selectively modifies the input state of the particular actuator from an inactive state to an active state.

As shown in FIG. 5, the distance between the user's index finger 501 and one or more input elements 521 of the input receiver 520 is within a predetermined distance threshold, and the user's index finger 501 is closer to the input elements 521 of the input receiver 520 than any other finger. Accordingly, the mixed-reality system modifies the input state of the user's index finger 501 to an active state.

In some embodiments, where a set of more than one actuator meets the predetermined distance threshold, the mixed-reality system changes the input state for each actuator in the set to an active state, or only changes the state for the actuator in the set that is in closest proximity to one or more input elements of the input receiver.

Those skilled in the art will recognize that other mechanisms are suitable for detecting the presence of a triggering attribute associated with the input controller, and are within the scope of this disclosure. For instance, a triggering attribute of the input controller may be based on prior input detected by the input receiver. By way of example, if the mixed-reality system receives user input at the input receiver corresponding to a press of the T key followed by the H key, the mixed-reality system identifies this sequence of user input detected as a triggering attribute and, based on a prediction that the E key will be pressed by the user, selectively modifies the input state of the user's left middle finger to an active state in anticipation of the user pressing the E key to spell the word "the".

Figure 6:
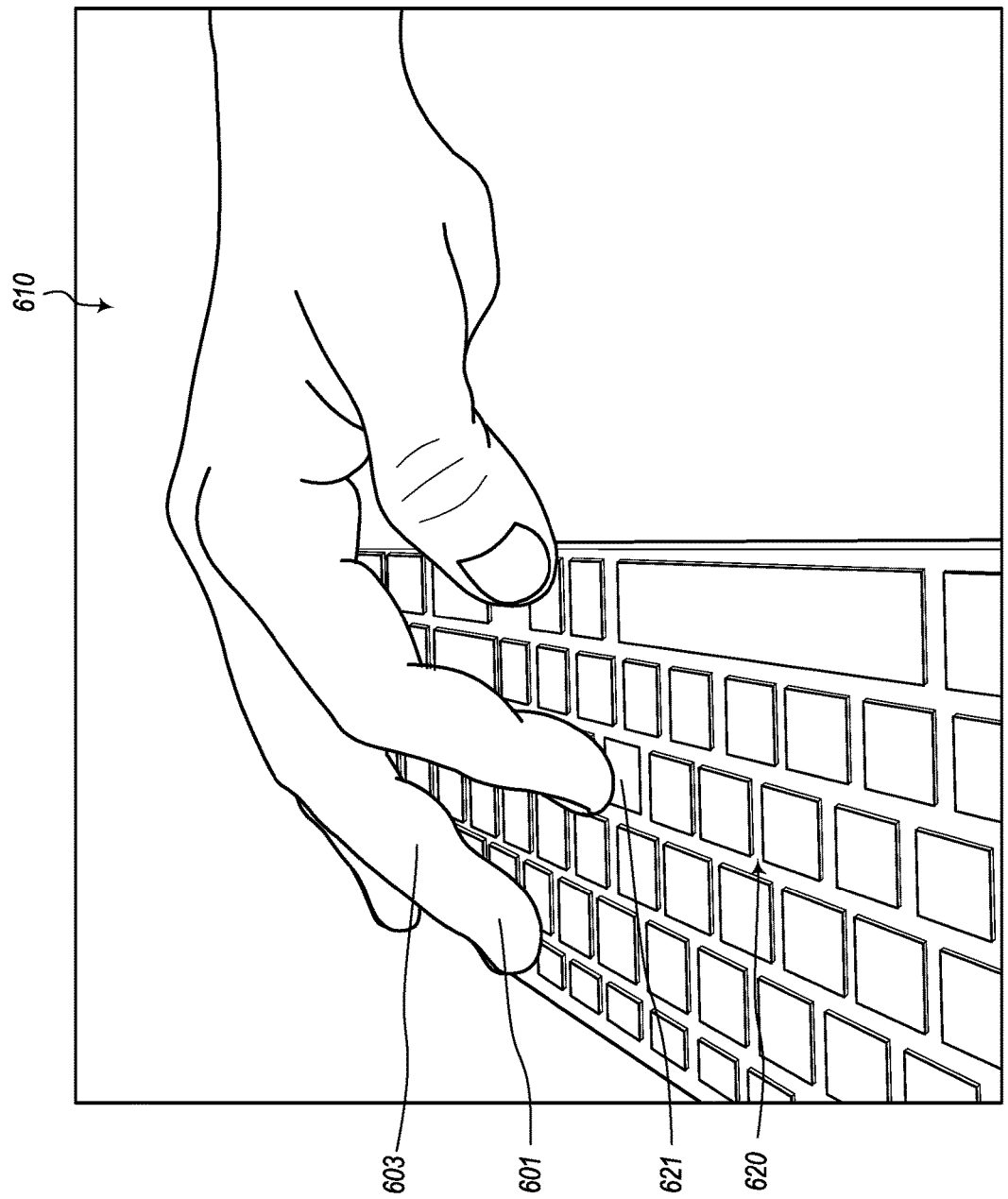
FIG. 6 illustrates an exemplary embodiment of an actuator providing user input at a mixed-reality input receiver in a mixed-reality environment.

FIG. 6 illustrates an exemplary embodiment of an actuator of an input controller providing user input at a mixed-reality input receiver in a mixed-reality environment. In particular, FIG. 6 shows a user's index finger 601 of their hand 610 interacting with a virtual keyboard 620 to provide user input within a mixed-reality environment. In the illustrated embodiment, only one finger, the user's index finger 601, is interacting with a key 621 of the virtual keyboard 620.

In some embodiments, the mixed-reality system is configured such that the input state of only a single actuator of the plurality of actuators is set to the active state at a time, while the other actuators are set to the inactive state. As such, in some implementations, upon modifying the input state of one actuator from the inactive state to the active state, the mixed-reality system modifies the input state of a precedingly active actuator from the active state to the inactive state. For example, in FIG. 6, if the user's middle finger 603 was previously active, once the mixed-reality system detects the presence of a triggering attribute for the user's index finger 601, the mixed-reality system changes the input state of the index finger 601 to an active state and the input state of the middle finger 603 to the inactive state. In some instances, this functionality reduces the number of unintentional input receiver element presses in a mixed-reality environment.

In some embodiments, multiple input elements of the mixed-reality input receiver are intended to be pressed simultaneously. For example, alternative keyboard inputs are available for many keyboard keys if the Shift key or the Control key is pressed simultaneously with another key. Accordingly, in some embodiments, the mixed-reality system is configured to selectively allow more than one key to be in the active state simultaneously. By way of example, the mixed-reality system, in some embodiments, detects a user input which corresponds to a pressing of a key that unlocks alternative inputs on a virtual input receiver (such as a Shift or Control key on a virtual keyboard), and in response to this detection, the mixed-reality system selectively allows more than one actuator of the input controller to be in the active state simultaneously (e.g., to allow the user to utilize the alternative inputs made possible by the Shift or Control key).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
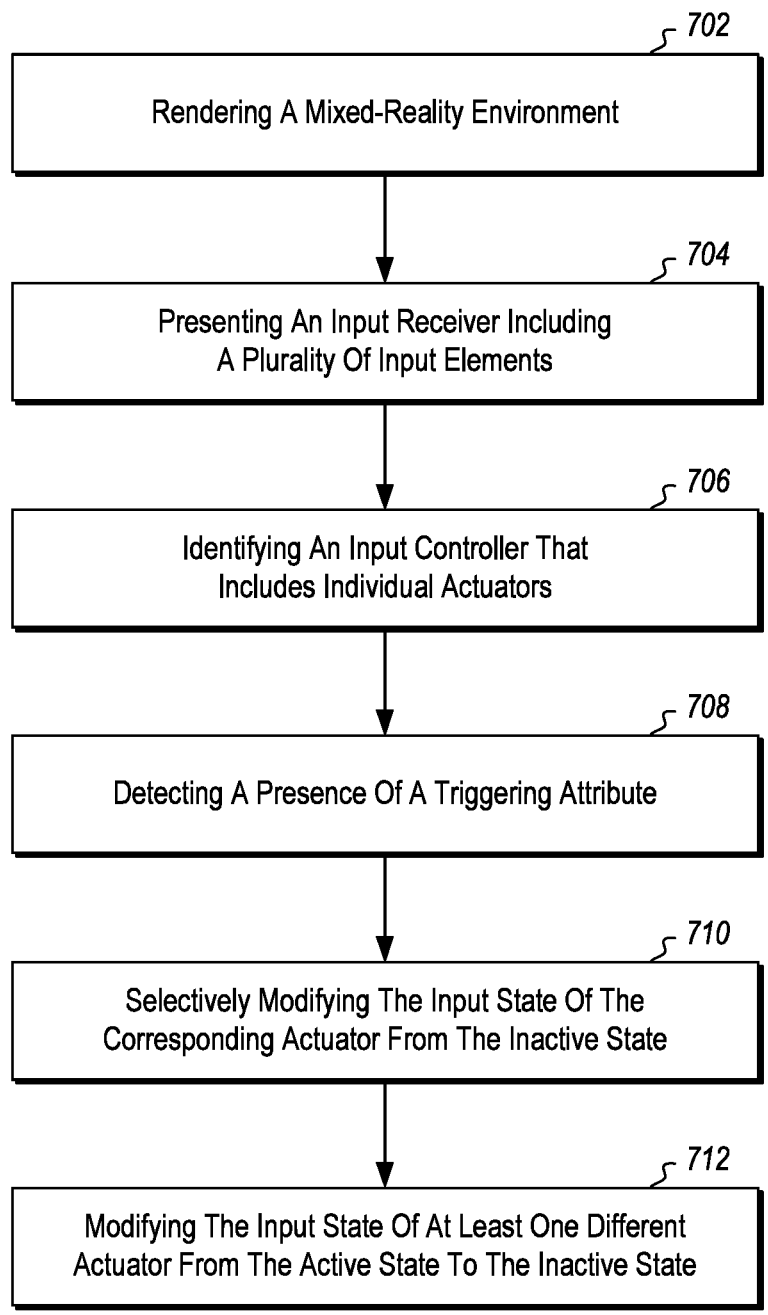
FIG. 7 shows an exemplary flow diagram depicting a method for detecting user input in a mixed-reality environment.

FIG. 7 shows a flow diagram 700 depicting acts of methods associated with detecting user input in a mixed-reality environment and in a manner that includes selectively activating different actuators based on triggering attributes. In particular, the illustrated flow diagram 700 includes acts of rendering a mixed-reality environment (702), presenting an input receiver including a plurality of input elements (704), identifying an input controller that includes individual actuators (706), detecting a presence of a triggering attribute (708), selectively modifying the input state of the corresponding actuator from the inactive state to the active state (710), and modifying the input state of at least one different actuator from the active state to the inactive state (712).

Act 702 includes rendering a mixed-reality environment. In some embodiments, the mixed-reality environment includes one or more holograms which are presented to a user at a mixed-reality display device and where the user may interact with one or more objects.

Act 704 includes presenting an input receiver including a plurality of input elements. In some embodiments, the input receiver is a QWERTY layout virtual keyboard with various keys for receiving input from the user's hand (e.g., the alphanumeric, modifier, cursor, system command, and other keys of the virtual keyboard). In other embodiments, the input receiver is implementable as any virtual object including a plurality of input elements that are configured for selectively receiving input from individual actuators of an input controller. For example, in some embodiments, an input receiver is a virtual ABCDE, Dvorak, Colemak, or Workman layout keyboard, or a virtual touch screen, digitizer, tablet, or other input receiver. Furthermore, in some embodiments, the input receiver includes various portions, such as a QWERTY portion and a number pad portion.

Act 706 includes identifying an input controller that includes individual actuators. In some embodiments, the input controller is a user's hand (or a virtual representation thereof), or any object including a plurality of individual actuators which are configurable to interact with one or more input elements of an input receiver. By way of example, an input controller may be implemented as a plurality of user-operated control wands, which could be user fingers, for example. Alternatively, the wands could be objects held in a user's hand. Other controllers can also be used.

Act 708 includes detecting a presence of a triggering attribute. In some embodiments, the triggering attribute is associated with the input controller and is based on a pose of one or more of the individual actuators of the input controller, a motion characteristic (e.g., velocity, absolute location or location relative to the input elements, speed, etc.) of a set of one or more of the individual actuators of the plurality of actuators of the input controller, a position of a set of one or more of the individual actuators of the plurality of actuators relative to a set of one or more input elements of the input receiver, and/or prior input detected by the input receiver.

Act 710 includes selectively modifying the input state of the corresponding actuator from the inactive state to the active state. In some embodiments, the input state of only a single actuator of the plurality of actuators is set to the active state at a time, while the other actuators are set to the inactive state. In other embodiments, the mixed-reality system is configured to selectively allow more than one key to be in the active state simultaneously, such as when a key that unlocks alternative inputs on a virtual input receiver is pressed. In yet other embodiments, the number of keys allowed to be in the active state is unrestrained. When more than one input element may be selected at a same time, the system may selectively activate multiple actuators to provide input at a same time.

Act 712 includes modifying the input state of at least one different actuator from the active state to the inactive state. In some embodiments, act 712 is particularly performed where the mixed-reality system only allows one actuator of the input controller to be in the active state at a time. When an actuator is in an active state, and when that actuator in the active state intersects a plane or space associated with a particular input element, then input is generated by the input element (based on the input element control attributes specified by the controlling application for that input element). In some instances, the system generates the input associated with the input element automatically in response to detecting the active state actuator intersecting with the input element. This may include the system sending a notification to the controlling application of the input event that is sufficient to generate the input.

In some instances, only a single input can be received at the input object at a time and/or only a single actuator of the controller can be actively used to provide input at a time, so as to avoid further inadvertent input entries from being processed. In other embodiments, all or a subset of selected actuators (and sometimes only particular actuator pairs) can provide input simultaneously at a same input object.

When the input state of the object(s) is activated or deactivated, a visual identifier/highlighting may be represented with the input object(s) to reflect which object(s) are active at any given time.

Those skilled in the art will recognize that, in some embodiments, method 700 is carried out wherein each individual actuator of a mixed-reality input controller is mapped to a corresponding set or subset of input elements of the mixed-reality input receiver. As such, in such embodiments, each individual actuator becomes configured for selectively providing user input to only the subset of input elements to which the individual actuator is mapped.

Although the foregoing description has focused on embodiments in which a mixed-reality system detects the presence of a triggering event to selectively modify the state of an actuator of an input controller to allow the actuator to interact with an input element or set of input elements of an input receiver to which the actuator is mapped, those skilled in the art will recognize that other embodiments within the scope of this disclosure exist for optimizing the detection of user input in a mixed-reality environment. These embodiments may, in some instances, allow for increased accuracy in detecting user input in a computationally inexpensive manner.

Figure 8:
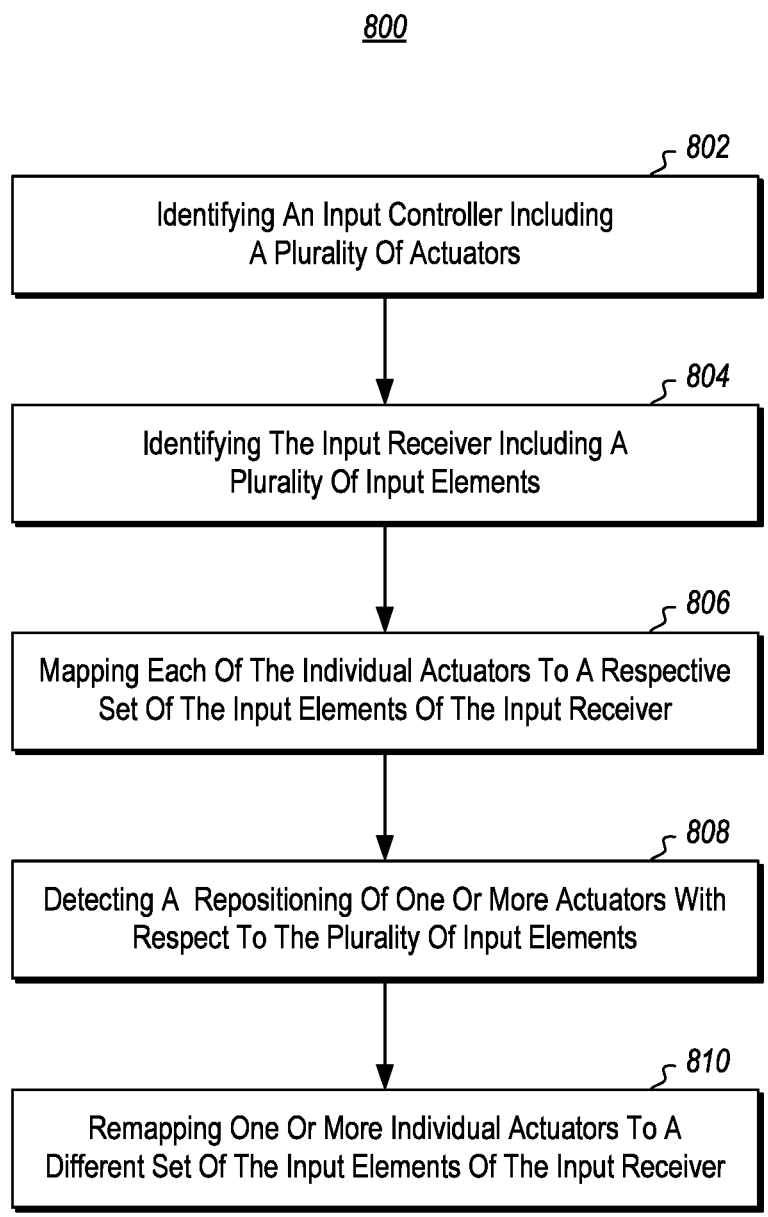
FIG. 8 shows an exemplary flow diagram depicting a method for detecting user-object interaction in a mixed-reality environment using directional constraints.

FIG. 8 shows a flow diagram 800 depicting acts associated with methods for detecting user input in a mixed-reality environment in a computationally lightweight manner. In particular, method 800 includes acts of identifying an input controller including a plurality of actuators (802), identifying the input receiver including a plurality of input elements (804), mapping each of the individual actuators to a respective set of the input elements of the input receiver (806), detecting a repositioning of one or more actuators with respect to the plurality of input elements (808), and remapping one or more individual actuators to a different set of the input elements of the input receiver (810).

Act 802 includes identifying an input controller including a plurality of actuators. In some embodiments, the input controller is adapted for providing input in the mixed-reality environment, and the individual actuators of the plurality of actuators are configured to interact with one or more input elements of an input receiver to provide corresponding user input through the one or more input elements of an input receiver in the mixed-reality environment. In some embodiments, the input controller is embodied as a user's hand, with the user's fingers operating as the actuators.

Act 804 includes identifying the input receiver including a plurality of input elements. In some embodiments, the input elements of the plurality of input elements are each configured, when interacted with by one or more of the plurality of actuators, for receiving the corresponding user input. In some embodiments, a virtual keyboard serves as the input receiver, with its keys serving as the input elements thereof. Furthermore, in some embodiments, the input receiver includes various portions, such as a QWERTY portion and a number pad portion.

Act 806 includes mapping each of the individual actuators to a respective set of the input elements of the input receiver. In some embodiments, the mapping is performed such that each of the individual actuators is configured to only provide user input to the respective set of input elements to which it is associated and wherein at least a first actuator of the plurality of actuators is mapped to a first set of input elements that is different than a second set of input elements that is mapped to a second actuator of the plurality of actuators. In some embodiments, the mapping is performed without first detecting the presence of a triggering attribute for changing the input state of an actuator to an active state.

Figure 9:
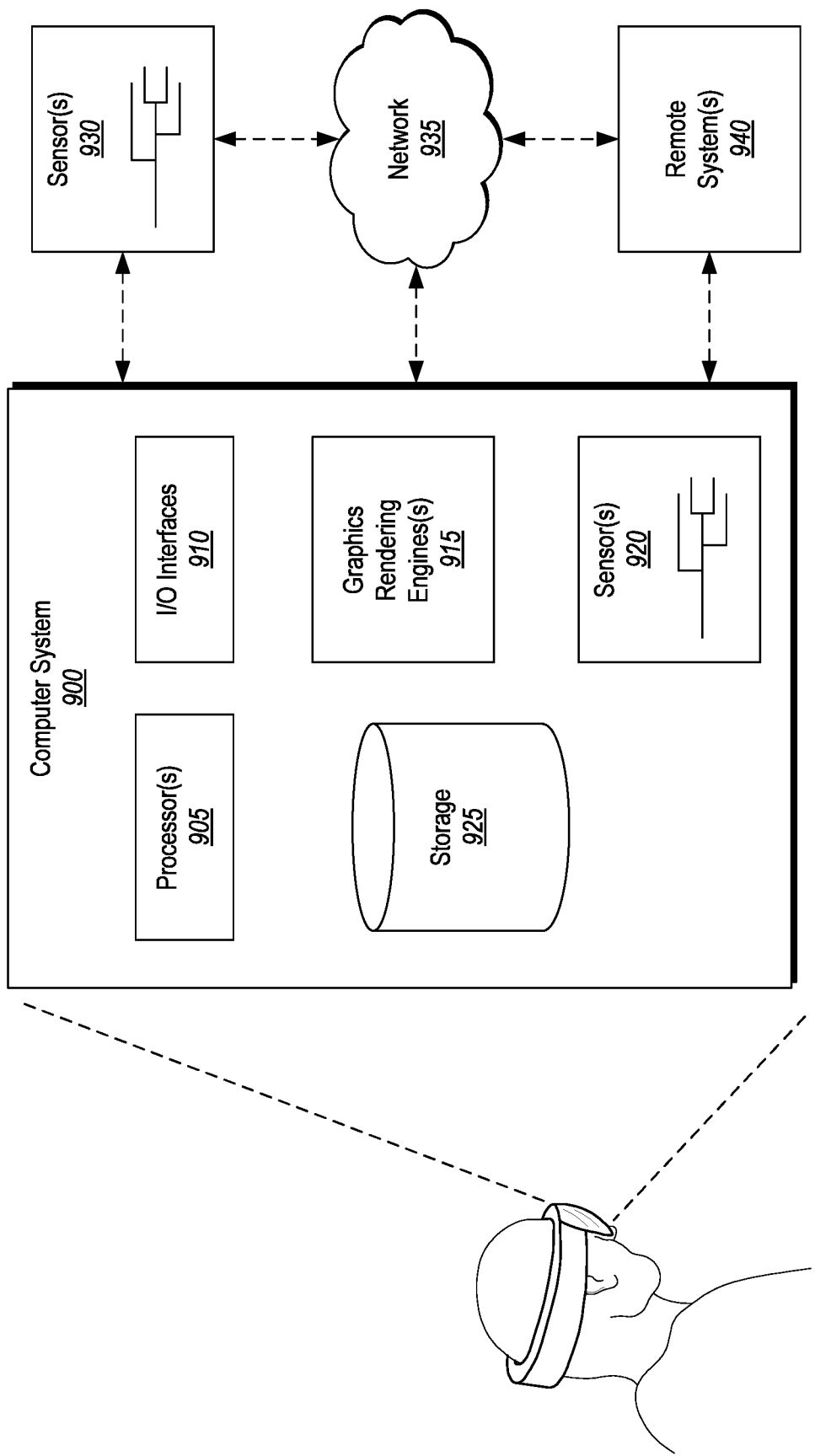
FIG. 9 illustrates an exemplary computer system that may be used to perform embodiments disclosed herein.

In some instances, the mapping occurs dynamically, in response to detecting an input gesture that involves an interaction of one or more actuator(s) with input element(s), or alternatively, a gesture that precedes the actual input gesture. In other embodiments, the mapping is a predefined mapping, one that is established prior to detecting the input gesture. The stored mapping may be stored in the system storage (925) that is locally maintained and/or in one or more remote system(s) 940 (FIG. 9).

Act 808 includes detecting a repositioning of one or more actuators with respect to the plurality of input elements. In some embodiments, the repositioning occurs when a user repositions their input controller, or the individual actuators thereof, so as to interact with or provide user input to a different set of input elements of the input receiver. By way of example, the detected repositioning may correspond to a user shifting the position of their hand from being over a QWERTY layout portion of a keyboard to being over a number pad of a keyboard, or vice versa. In other instances, the detected repositioning is a user reconfiguring their fingers or hand position to provide user input to a virtual touch screen in an alternative way.

Act 810 includes remapping one or more individual actuators to a different set of the input elements of the input receiver. In some instances, the changing the input elements of the input receiver to which one or more of the individual actuators of the input controller are mapped. By way of non-limiting example, when a user's right hand is positioned over a QWERTY layout portion of a keyboard, the user's middle finger is mapped to a first set of keys of the keyboard (e.g., the I, K, and comma/less than keys of the QWERTY layout portion). Upon determining that the user has repositioned their right hand over a number pad of the keyboard, the middle finger is subsequently mapped to a second set of keys of the keyboard (e.g., the 8, 5, and 2 keys of the number pad).

In some instances, the mapped keys/input elements for a particular actuator are only selectively activated during dynamic mapping of the particular actuator to the corresponding input elements, such that the particular actuator will not inadvertently trigger input if it were to intersect with another (unmapped) key during use in the mixed-reality environment.

The disclosed embodiments may, in some instances, provide various advantages over conventional systems and methods for detecting user input in mixed-reality environments. Some of these advantages include providing users with functionality that ameliorates and/or eliminates the unintentional entry of user input in mixed-reality input receivers.

Having just described the various features and functionalities of some of the disclosed embodiments, attention is now directed to FIG. 9, which illustrates an example computer system 900 that may be used to facilitate the operations described herein.

The computer system 900 may take various different forms. For example, in FIG. 9, the computer system 900 is embodied as a head-mounted display (HMD). Although the computer system 900 may be embodied as a HMD, the computer system 900 may also be a distributed system that includes one or more connected computing components/devices that are in communication with the HMD. Accordingly, the computer system 900 may be embodied in any form and is not limited strictly to the depiction illustrated in FIG. 9. By way of example, the computer system 900 may include a projector, desktop computer, a laptop, a tablet, a mobile phone, server, data center and/or any other computer system.

In its most basic configuration, the computer system 900 includes various different components. For example, FIG. 9 shows that computer system 900 includes at least one hardware processing unit 905 (aka a "processor"), input/output (I/O) interfaces 910, graphics rendering engines 915, one or more sensors 920, and storage 925. More detail on the hardware processing unit 905 will be presented momentarily.

The storage 925 may be physical system memory, which may be volatile, non-volatile, or some combination of the two. The term "memory" may also be used herein to refer to non-volatile mass storage such as physical storage media. If the computer system 900 is distributed, the processing, memory, and/or storage capability may be distributed as well. As used herein, the term "executable module," "executable component," or even "component" can refer to software objects, routines, or methods that may be executed on the computer system 900. The different components, modules, engines, and services described herein may be implemented as objects or processors that execute on the computer system 900 (e.g. as separate threads).

The disclosed embodiments may comprise or utilize a special-purpose or general-purpose computer including computer hardware, such as, for example, one or more processors (such the hardware processing unit 905) and system memory (such as storage 925), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 900 may also be connected (via a wired or wireless connection) to external sensors 930 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 900 may also be connected through one or more wired or wireless networks 935 to remote systems(s) 940 that are configured to perform any of the processing described with regard to computer system 900.

During use, a user of the computer system 900 is able to perceive information (e.g., a mixed-reality environment) through a display screen that is included among the I/O interface(s) 910 and that is visible to the user. The I/O interface(s) 910 may include the input elements described herein, which are linked to one or more underlying applications generating information for the mixed-reality scene.

The I/O interface(s) 910 and sensors 920/930 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) [e.g., input controller/actuators and input elements] that the user may interact with while being immersed in the scene.

The graphics rendering engine 915 is configured, with the hardware processing unit 905, to render one or more virtual objects within the scene. As a result, the virtual objects accurately move in response to a movement of the user and/or in response to user input as the user interacts within the virtual scene.

A "network," like the network 935 shown in FIG. 9, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 900 will include one or more communication channels that are used to communicate with the network 935. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 905). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured for detecting user input in a mixed-reality environment, the system comprising:
    one or more processors; and
    one or more computer-readable media having stored computer-executable instructions that are operable, when executed by the one or more processors, to configure the system to perform the following:
        render a mixed-reality environment with one or more holograms;
        present an input receiver within the mixed-reality environment as a hologram, the input receiver including a plurality of input elements that are configured for selectively receiving input from a plurality of individual fingers of a user's hand based on an input state of the individual fingers and a predefined mapping of the individual fingers to different input elements;
        identify the user's hand that includes the individual fingers, wherein each corresponding finger of the individual fingers is configured to, when interacting with one or more input elements of the input receiver that are mapped according to the predefined mapping to the corresponding finger and when the input state of the corresponding finger is an active state, provide user input within the mixed-reality environment;
        detect a presence of a triggering attribute of the user's hand that is operable, when present in the mixed-reality environment, to selectively change the input state of the corresponding finger from an inactive state to an active state for the one or more input elements that are mapped according to the predefined mapping to the corresponding finger; and
        in response to detecting the presence of the triggering attribute of the user's hand, selectively modify the input state of the corresponding finger from the inactive state to the active state for enabling the corresponding finger to provide the user input when the corresponding finger interacts with the one or more input elements that are mapped according to the predefined mapping to the corresponding finger within the mixed-reality environment, while the input state of at least one other finger of the individual fingers of the user's hand remains in the inactive state, wherein while the input state of the at least one other finger of the individual fingers of the user's hand remains in the inactive state, the at least one other finger is disabled from providing user input at the input receiver within the mixed-reality environment when the at least one other finger interacts with an input element of the plurality of input elements of the input receiver in a manner that would otherwise be processed as user input interacting with the one or more input elements if the at least one other finger was, alternatively, in the active state.

2. The system of claim 1, wherein each of the individual fingers of the plurality of individual fingers is mapped to a different corresponding subset of the plurality of input elements for selectively providing user input when interacting with the plurality of input elements.

3. The system of claim 1, wherein the triggering attribute of the user's hand is based on a pose of a set of individual fingers of the plurality of individual fingers of the user's hand.

4. The system of claim 1, wherein the triggering attribute of the user's hand is based on a motion characteristic of a set of one or more of the individual fingers of the plurality of individual fingers of the user's hand.

5. The system of claim 1, wherein the triggering attribute of the user's hand is based on a position of a set of one or more of the individual fingers of the plurality of individual fingers relative to a set of one or more input elements of the input receiver.

6. The system of claim 1, wherein the triggering attribute of the user's hand is based on prior input detected by the input receiver.

7. The system of claim 1, wherein the input state of only a single finger of the plurality of individual fingers is set to the active state and wherein the input state of all other fingers of the plurality of individual fingers are set to the inactive state.

8. The system of claim 7, wherein the computer-executable instructions are further operable to configure the system to, in response to selectively modifying the input state of the corresponding finger from the inactive state to the active state, modify the input state of at least one different finger of the plurality of individual fingers from the active state to the inactive state.

9. The system of claim 1, wherein when the corresponding finger is in the active state, the corresponding finger is only enabled to provide the user input within the mixed-reality environment by interacting with the one or more input elements of the input receiver that are mapped according to the predefined mapping to the corresponding finger, and the corresponding finger is disabled from providing the user input within the mixed-reality environment by interacting with one or more input elements of the input receiver that are not mapped according to the predefined mapping to the corresponding finger.

10. A method for detecting user input in a mixed-reality environment, the method comprising:
    rendering a mixed-reality environment with one or more holograms;
    presenting an input receiver within the mixed-reality environment as a hologram, the input receiver including a plurality of input elements that are configured for selectively receiving input from a plurality of individual fingers of a user's hand based on an input state of the individual fingers and a predefined mapping of the individual fingers to different input elements;
    identifying the user's hand that includes the individual fingers, wherein each corresponding finger of the individual fingers is configured to, when interacting with one or more input elements of the input receiver that are mapped according to the predefined mapping to the corresponding finger and when the input state of the corresponding finger is an active state, provide user input within the mixed-reality environment;
    detecting a presence of a triggering attribute of the user's hand that is operable, when present in the mixed-reality environment, to selectively change the input state of the corresponding finger from an inactive state to an active state for the one or more input elements that are mapped according to the predefined mapping to the corresponding finger; and in response to detecting the presence of the triggering attribute of the user's hand, selectively modifying the input state of the corresponding finger from the inactive state to the active state for enabling the corresponding finger to provide the user input when the corresponding finger interacts with the one or more input elements that are mapped according to the predefined mapping to the corresponding finger within the mixed-reality environment, while the input state of at least one other finger of the individual fingers of the user's hand remains in the inactive state, wherein while the input state of the at least one other finger of the individual fingers of the user's hand remains in the inactive state, the at least one other finger is disabled from providing user input at the input receiver within the mixed-reality environment when the at least one other finger interacts with an input element of the plurality of input elements of the input receiver in a manner that would otherwise be processed as user input interacting with the one or more input elements if the at least one other finger was, alternatively, in the active state.

11. The method of claim 10, wherein each of the individual fingers of the plurality of individual fingers is mapped to a different corresponding subset of the plurality of input elements for selectively providing user input when interacting with the plurality of input elements.

12. The method of claim 10, wherein the triggering attribute of the user's hand is based on a pose of a set of individual fingers of the plurality of individual fingers of the user's hand.

13. The method of claim 10, wherein the triggering attribute of the user's hand is based on a motion characteristic of a set of one or more of the individual fingers of the plurality of individual fingers of the user's hand.

14. The method of claim 10, wherein the triggering attribute of the user's hand is based on a position of a set of one or more of the individual fingers of the plurality of individual fingers relative to a set of one or more input elements of the input receiver.

15. The method of claim 10, wherein the triggering attribute of the user's hand is based on prior input detected by the input receiver.

16. The method of claim 10, wherein the input state of only a single finger of the plurality of individual fingers is set to the active state and wherein the input state all other fingers of the plurality of individual fingers are set to the inactive state.

17. The method of claim 16, further comprising: in response to selectively modifying the input state of the corresponding finger from the inactive state to the active state, modifying the input state of at least one different finger of the plurality of individual fingers from the active state to the inactive state.

18. One or more hardware storage devices having stored thereon computer-executable instructions, the computer-executable instructions being executable by one or more processors of a computer system to configure the computer system to:

render a mixed-reality environment with one or more holograms;

present an input receiver within the mixed-reality environment as a hologram, the input receiver including a plurality of input elements that are configured for selectively receiving input from a plurality of individual fingers of a user's hand based on an input state of the individual fingers and a predefined mapping of the individual fingers to different input elements;

identify the user's hand that includes the individual fingers, wherein each corresponding finger of the individual fingers is configured to, when interacting with one or more input elements of the input receiver that are mapped according to the predefined mapping to the corresponding finger and when the input state of the corresponding finger is an active state, provide user input within the mixed-reality environment;

detect a presence of a triggering attribute of the user's hand that is operable, when present in the mixed-reality environment, to selectively change the input state of the corresponding finger from an inactive state to an active state for the one or more input elements that are mapped according to the predefined mapping to the corresponding finger; and in response to detecting the presence of the triggering attribute of the user's hand, selectively modify the input state of the corresponding finger from the inactive state to the active state for enabling the corresponding finger to provide the user input when the corresponding finger interacts with the one or more input elements that are mapped according to the predefined mapping to the corresponding finger within the mixed-reality environment, while the input state of at least one other finger of the individual fingers of the user's hand remains in the inactive state, wherein while the input state of the at least one other finger of the individual fingers of the user's hand remains in the inactive state, the at least one other finger is disabled from providing user input at the input receiver within the mixed-reality environment when the at least one other finger interacts with an input element of the plurality of input elements of the input receiver in a manner that would otherwise be processed as user input interacting with the one or more input elements if the at least one other finger was, alternatively, in the active state.

19. The one or more hardware storage devices of claim 18, wherein each of the individual fingers of the plurality of individual fingers is mapped to a different corresponding subset of the plurality of input elements for selectively providing user input when interacting with the plurality of input elements.

20. The one or more hardware storage devices of claim 18, wherein the triggering attribute of the user's hand is based on at least one of the following: a pose of a set of individual fingers of the plurality of individual fingers of the user's hand, a motion characteristic of a set of one or more of the individual fingers of the plurality of individual fingers of the user's hand, a position of a set of one or more of the individual fingers of the plurality of individual fingers relative to a set of one or more input elements of the input receiver, or prior input detected by the input receiver.

21. The one or more hardware storage devices of claim 18, wherein the input state of only a single finger of the plurality of individual fingers is set to the active state and wherein the input state of all other fingers of the plurality of individual fingers are set to the inactive state, and wherein the computer-executable instructions are further operable to cause the system to, in response to selectively modifying the input state of the corresponding finger from the inactive state to the active state, modify the input state of at least one different finger of the plurality of individual fingers from the active state to the inactive state.

* * * * *